Patented Apr. 2, 1929.

1,707,277

UNITED STATES PATENT OFFICE.

TORAZO OKURI, OF TOKYO, JAPAN.

BINDER FOR LAMINATED MICA PRODUCTS.

No Drawing. Application filed November 9, 1926. Serial No. 147,395, and in Japan August 5, 1926.

My invention relates to insulating and non-heat conducting mica plates, for use in electric heaters, more especially plates built up of a plurality of pieces of mica united together by an insulating inorganic paste composed of inorganic salts (fire clay, borate, silicate, magnesium chlorate, and caustic soda). The object of the invention is to obtain, inexpensively, mica plates which have good insulating and non-heat conducting properties, and which can be manufactured in numerous shapes, sizes, and thicknesses like natural mica plates and to this end, I have invented an adhesive by which the mica material may be united to give a strong mass having excellent insulating properties.

Hitherto, mica plates used in electric heaters have been mainly natural mica plates, but they are naturally restricted as to their shapes and sizes. Moreover, natural ones can not be said to be perfect in respect to their proof against heat, for it is generally experienced that when heated up to a temperature of 800° C. or so, they become cracked and fail, and accordingly their insulating power is lessened. My invention, however, is to obviate these defects, and its essential feature is to take mica pieces of various sizes and shapes, and solidify them with a special insulating inorganic paste. The paste used must be an insulating and adhesive substance and is produced by treating several kinds of inorganic salts, that is, fire clay, borate, silicate, magnesium chlorate, and caustic soda.

The following is an example illustrating one method of carrying this invention into practice:—

Take fire clay, potassium borate or sodium borate, potassium silicate or sodium silicate respectively in a quantity of water, heat the mixture up to a temperature of about 150–200° C., with agitation. Put the milky liquid produced thereby into an autoclave with the proper quantities of magnesium chlorate and caustic soda, and put under heat and pressure till a sticky inorganic paste is obtained. In this case, these salts should be pure and anhydrous, and the proportion of their quantities is advantageously as follows:—

| | Parts. |
|---|---|
| Fire clay | 1–3 |
| Potassium borate or sodium borate | 20–30 |
| Potassium silicate or sodium silicate | 2–5 |
| Magnesium chlorate | 0.5–1 |
| Caustic soda | 0.5–1 |

Then, apply the insulating inorganic paste thus obtained, with brushes or the like, to mica flakes or pieces of about one mil thickness, paste them together to the required shape and thickness, and under a little heat and pressure mold them in the shape of a plate.

The mica plates of the present invention, thanks to the insulating inorganic paste used for solidifying mica pieces, do not in the least loose the insulating power of mica itself, but moreover are excellent proof against heat. If exposed to a temperature of 850° C., they undergo no substantial change, and keep their insulating power sufficiently. Mica plates themselves can hardly display such a strong proof against heat; but when the special inorganic paste of my invention solidifies mica plates, they become denser, as they are heated, than at usual temperature. Therefore, the original nature of mica is protected, and accordingly, can display such proof against heat as above described. Furthermore, as the mica used as material can be in the form of flakes or fine pieces, it is much cheaper as compared with natural mica plates, and besides, it is not restricted as to its sizes and thicknesses. While the heating coil which touches with mica plate is protected by the non-heat conducting mica plate, it has the great advantage of lengthening the life of resistance wire.

Having now particularly described and ascertained the nature of my said invention and in what manner the same is to be performed, I declare that what I claim is:—

1. In a laminated mica product, a binder for the mica laminæ comprising the reaction product of heating under pressure an aqueous mixture comprising fire clay, an alkali metal borate, an alkali metal silicate, magnesium chlorate and caustic soda.

2. In a laminated mica product, a binder for the mica laminæ comprising the reaction product of heating under pressure an aqueous mixture comprising fire clay, 1–3 parts, an alkali metal borate, 20–30 parts, an alkali metal silicate, 2–5 parts, magnesium chlorate, 0.5–1 parts and caustic soda, 0.5–1 parts.

In testimony whereof I have affixed my signature.

TORAZO OKURI.